Figure 1:
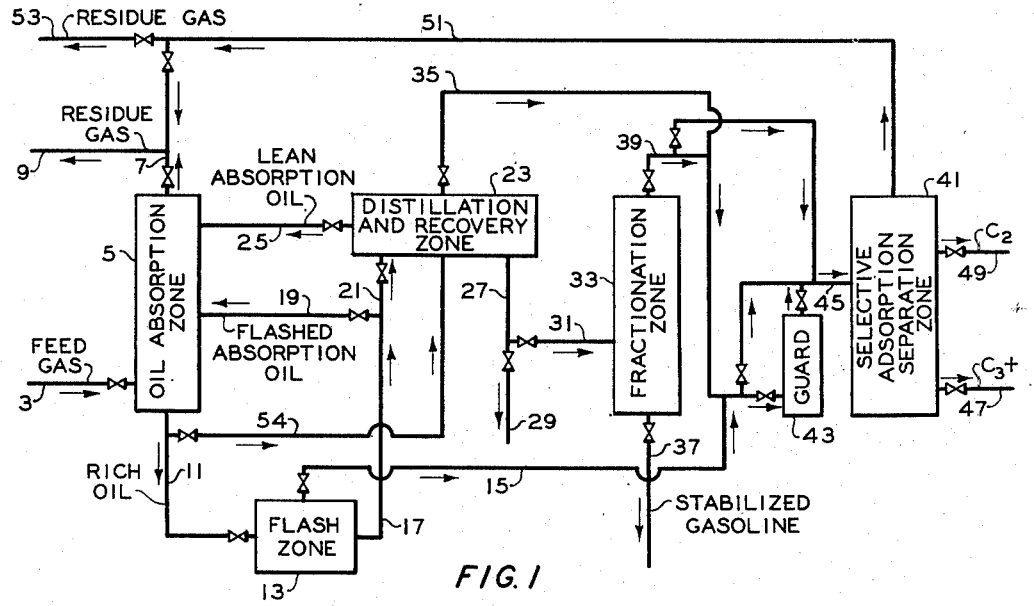

INVENTOR.
A. J. MILLER
BY Hudson and Young
ATTORNEYS

Patented Mar. 3, 1953

2,630,403

UNITED STATES PATENT OFFICE 2,630,403

METHOD OF SEPARATING AND RECOVERING HYDROCARBONS

Alvin J. Miller, Bartlesville, Okla., assignor to Phillips Petroleum Company, a corporation of Delaware Application June 10, 1949, Serial No. 98,369

2 Claims. (Cl. 196—8)

This invention relates to the separation and recovery of hydrocarbon materials. In one of its more specific aspects it relates to separating and recovering low-boiling normally gaseous hydrocarbon materials from a gaseous mixture comprising said low-boiling normally gaseous hydrocarbon materials, higher boiling hydrocarbon materials and lower boiling normally gaseous hydrocarbon materials. In another of its more specific aspects it relates to recovering gasoline from natural gas and/or other gaseous hydrocarbon streams. In still another of its more specific aspects it relates to recovering liquefied petroleum gases and gasoline from a natural gas or other gaseous hydrocarbon stream comprising saturated and/or unsaturated $C_1$ to more than $C_5$ hydrocarbons and other low-boiling normally gaseous materials.

The use of a moving bed of activated-charcoal, or other materials which will selectively absorb hydrocarbon materials for separation and recovery of low-boiling normally gaseous hydrocarbons, such as butanes, propane and ethane, is not feasible at pressures above about 480 pounds per square inch absolute because of the difficulty in stripping the adsorbed hydrocarbons and in regenerating the selective adsorbent. For these reasons, selective adsorption separation and recovery of low-boiling normally gaseous hydrocarbon streams using moving beds of adsorbent is usually carried out at pressures not above about 400 pounds per square inch absolute. Many available hydrocarbon gas streams have pressures of 400 pounds per square inch absolute and higher, and it is not feasible to separate and recover $C_2$, $C_3$ and $C_4$ hydrocarbons directly by using moving bed selective adsorption separation systems from such high pressure gases. There are many natural gas fields, as well as refinery residue gases, existing at relatively high pressures of from 400 to 5,000 pounds per square inch gauge from which it is desirable to recover gasoline and low-boiling normally gaseous materials such as $C_2$, $C_3$ and/or $C_4$ hydrocarbons. The wet gases from many of these gas fields, particularly those field gases at pressures of from 1,000 to 5,000 pounds per square inch gauge, are treated by a process known as a cycling process, using flash-flood absorption or otherwise, that is, those hydrocarbons and other low-boiling normally gaseous materials which are not removed from the wet field gas are returned as dry gas to the field in order to maintain the pressure on the field so as not to lose recoverable hydrocarbons through the phenomenon of retrograde condensation. Since it is expensive to repressure the unrecovered hydrocarbons, it is desirable that the gases to be returned to the field are maintained at as high a pressure as possible. Also, maintaining pressure in a non-cycling plant is usually very desirable since residue gases are usually sold or used as fuel gas and it is usually desired to produce them at as high a pressure as possible. Further, it is desirable if possible to treat the wet field gas at or near its relatively high field gas pressure so that the principles of flash-flood oil absorption may be most advantageously used. In treating a gas by the flash-flood system of operation in the pressure range of from 100 to 5,000 pounds per square inch absolute, for instance, a cycling treating operation carried on at a pressure of from 1,000 to 5,000 pounds per square inch gauge, the low-boiling normally gaseous hydrocarbon materials such as $C_2$, $C_3$ and $C_4$ hydrocarbons are usually removed from the wet field gas with an absorption medium, usually mineral seal oil, which has been partially denuded, that is, denuded of $C_4$'s and lighter hydrocarbon materials. The $C_5$ and heavier hydrocarbons are absorbed with a lean absorption medium, that is, an absorption medium relatively completely denuded of absorbed hydrocarbons. The major disadvantage of flash flood operation is that the usually large quantity of flashed absorption medium (absorption oil denuded of $C_4$'s and lighter) circulation required absorbs a large quantity of methane. In the usual cycling treating plant, utilizing flash-flood principles or otherwise or in a non-cycling flash-flood treating plant, reabsorber systems are normally used in order to increase the recovery of low-boiling normally gaseous hydrocarbon materials desired to be recovered. In both systems high $C_2$ and $C_3$ recovery through absorption gives a relatively large amount of methane absorbed. Since absorption is not a very selective separation means, even operating so as to recover substantially all of the $C_3$'s gives a large amount of methane absorption. This methane must be removed from the system or it will build up in the internal reabsorber systems. The removal of the methane from the system to prevent this build up causes loss of low-boiling normally gaseous hydrocarbons desired to be recovered since separation means heretofore used are not selective enough to remove the methane while retaining the $C_2$, $C_3$ and/or $C_4$ hydrocarbons. In the usual cycling or flash-flood separation system expensive reabsorption and fractional distillation equipment is necessary to overcome the above mentioned problems and then only fair results are obtained. The expense of pumping the internally cycled reabsorption medium as well as the expense of heating and stripping the reabsorption medium is very high and is a major cost item in operating the system. Capital expenditure in building plants is greatly increased due to the necessity of providing reabsorption and fractional distillation equipment.

I have invented a new process for recovering low-boiling normally gaseous hydrocarbon materials, such as ethane, propane, and/or butanes, and heavier gasoline constituents from a gaseous hydrocarbon material mixture, such as a gaseous mixture comprising saturated $C_1$ to more than $C_5$ hydrocarbons and other low-boiling normally gaseous materials, said mixture comprising said low-boiling normally gaseous hydrocarbon materials, higher boiling hydrocarbon materials, such as natural gasoline constituents, and lower boiling normally gaseous hydrocarbon materials, such as methane. One embodiment of the process of my invention comprises contacting said gaseous hydrocarbon material feed mixture with a liquid absorption medium which has been denuded of said low-boiling normally gaseous hydrocarbon materials desired to be recovered under absorption conditions so as to absorb said low-boiling normally gaseous hydrocarbon materials, that is, contacting it with a liquid absorption medium containing said higher boiling hydrocarbons. The higher boiling hydrocarbons are removed from the gaseous hydrocarbon material feed mixture with a lean liquid absorption medium under absorption conditions so as to absorb said higher boiling hydrocarbon materials. The said lower boiling normally gaseous hydrocarbon materials unabsorbed in the above mentioned contacting steps are withdrawn from the system as a product of the process. Subsequently I separate and recover said higher boiling hydrocarbon materials and a hydrocarbon stream comprising said low-boiling normally gaseous hydrocarbon materials desired to be recovered from a rich absorption medium resulting from contacting, said lean liquid absorption medium, with said gaseous hydrocarbon material mixture as set forth above. Also, in an embodiment of the process of my invention I separate and recover a hydrocarbon stream comprising low-boiling normally gaseous hydrocarbon materials desired to be recovered from a rich absorption medium resulting from contacting, said liquid absorption medium denuded of said low-boiling normally gaseous hydrocarbon materials desired to be recovered, with said gaseous hydrocarbon material feed mixture as set forth above. The above mentioned hydrocarbon streams comprised of low-boiling normally gaseous hydrocarbon materials desired to be recovered are passed into a selective adsorption separation zone and therein I separate and recover said low-boiling normally gaseous hydrocarbon materials. The process of my invention utilizes principles of flash-flood absorption, that is, absorption of low-boiling normally gaseous hydrocarbon materials with a rich absorption medium which has been denuded of low-boiling normally gaseous hydrocarbon materials, and absorption of high-boiling hydrocarbons with a lean absorption medium, that is, an absorption medium which has been denuded of absorbed hydrocarbons as completely as practical. A selective adsorption separation zone is used in conjunction with and cooperates with the above mentioned flash-flood absorption process to separate and recover low-boiling normally gaseous hydrocarbon materials desired to be recovered.

The process of my invention has many advantages over the usual cycling treating system, utilizing flash-flood absorption or otherwise, or the usual non-cycling flash-flood absorption process. The reabsorber absorption medium cycle within the usual system is eliminated with the result that a considerable saving in power required to circulate the absorption medium is realized. Also, savings in heat and steam required for stripping the internally cycled reabsorption medium are realized. Because of the elimination of the reabsorption medium cycle, stripping and heating equipment can be reduced in size while still processing the same quantity of feed gas. I find that in operating by the process of my invention I can recover more of the desired hydrocarbons contained in the feed than can be recovered using the usual system. Also, as many of the $C_2$'s as desired can be extracted from the feed gas since there is no problem of methane build-up within the system necessitating withdrawal of methane. Methane absorbed passes through the selective adsorption separation zone without being adsorbed. As will hereinafter be made clear the process of my invention offers a means of utilizing moving bed selective adsorption separation systems to recover desired low-boiling normally gaseous hydrocarbon materials without lowering the pressure on substantially all of the residue dry gas, primarily methane, which is passed back into the wet gas field to maintain pressure. The process of my invention offers a method to recover gasoline constituents and low-boiling normally gaseous hydrocarbon materials from feed gas mixtures available at high pressures which is far superior in operating efficiency and requires less capital expenditure as well as operating expenditure than is possible with the usual type of system referred to hereinbefore. In addition, dry gas pressure is not lost.

It is an object of this invention to provide a method for separating and recovering hydrocarbons.

It is another object of this invention to provide a method for recovering gasoline from natural gas and/or gaseous hydrocarbon streams.

It is another object of this invention to provide a method for separating and recovering low-boiling normally gaseous hydrocarbon materials from a gaseous hydrocarbon material mixture which is under a high pressure and comprises said low-boiling normally gaseous hydrocarbon materials, higher boiling hydrocarbon materials and lower boiling normally gaseous hydrocarbon materials.

Still another object of my invention is to provide a method for treating a gaseous mixture comprising saturated $C_1$ to more than $C_5$ hydrocarbons and other low-boiling normally gaseous materials so as to separate and recover gasoline and $C_2$, $C_3$ and/or $C_4$ hydrocarbons.

Other objects and advantages of my invention will become apparent, to one skilled in the art, upon reading this disclosure.

Figure 2:
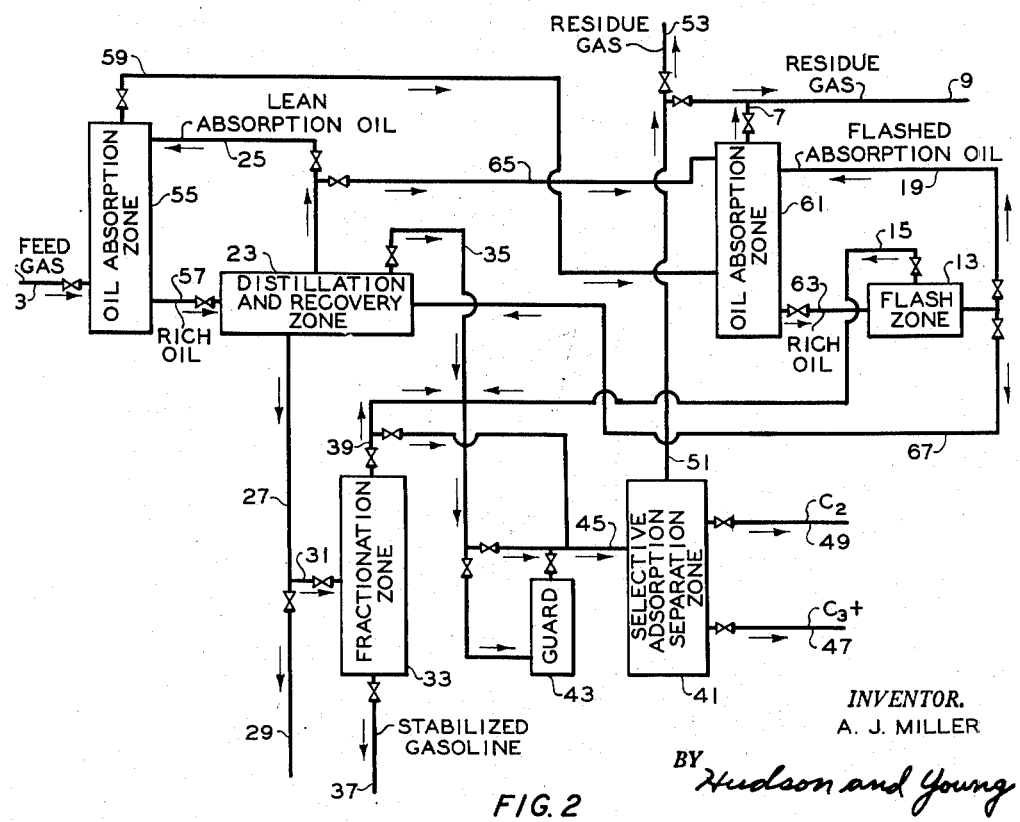

The drawings, Figure 1 and Figure 2, are a part of my disclosure. Figure 1 is a diagrammatic flow sheet showing a specific preferred embodiment of the process of my invention. Figure 2 is a diagrammatic flow sheet showing another preferred specific embodiment of the process of my invention.

The process of my invention can be used for separating and recovering low-boiling normally gaseous hydrocarbon materials from a gaseous hydrocarbon material feed mixture comprising said low-boiling normally gaseous hydrocarbon materials, higher boiling hydrocarbon materials, and lower boiling normally gaseous hydrocarbon materials. I find that the process of my invention is particularly adaptable for recovering liquefied petroleum gases, such as ethane, propane, and/or butanes, and natural gasoline from a natural gas, said natural gas falling within the description, a gaseous mixture comprising saturated $C_1$ to more than $C_5$ hydrocarbons and other normally gaseous materials, such as $N_2$, $CO_2$, and/or $H_2S$, etc. Although I prefer to treat a natural gas by the process of my invention, I find that the process of my invention can be used to treat any hydrocarbon gas stream, for instance a refinery residue gas, so as to recover light hydrocarbons, such as $C_2$'s, $C_3$'s and $C_4$'s, and gasoline.

The accompanying drawings, Figure 1 and Figure 2, set forth specific preferred embodiments of the process of my invention in which a feed gas stream is treated to recover light hydrocarbons and gasoline by using a flash-flood oil absorption system which cooperates with a selective adsorption separation system. The following discussion is directed to treating a gaseous mixture comprising $C_1$ to more than $C_5$ hydrocarbons and other low-boiling normally gaseous materials such as $N_2$, $CO_2$, $H_2S$, etc., to separate and recover liquefied petroleum gases, such as ethane, propane and/or butanes and gasoline, but such discussion is not to be deemed to unduly limit the scope of my invention. If natural gas is being treated, the hydrocarbons usually will be saturated. If a refinery gas is being treated, the hydrocarbon feed stream usually will be comprised of both saturated and unsaturated hydrocarbons. As set forth hereinbefore, the process of my invention is particularly useful and adaptable to treating wet gases which are available at a pressure of from 400 to 5,000 pounds per square inch gauge. My process operates so that unremoved "dry" gases remain at substantially the same pressure as the "wet" field gas so that they can be recycled back into the wet gas field with a minimum of compression.

Referring now to Figure 1, a gaseous feed mixture is passed via line 3 into the lower portion of oil absorption zone 5 which can be comprised of one or more absorbers. In absorption zone 5 the gaseous feed mixture countercurrently and directly contacts, in the lower portion of oil absorption zone 5, a flashed absorption oil, that is, an absorption oil, usually referred to as mineral seal oil, which has been denuded of $C_4$ and lighter hydrocarbons in a flashing operation as will hereinafter be set forth. In the upper portion of oil absorption zone 5 the gaseous feed mixture countercurrently and directly contacts lean absorption oil, that is, absorption oil which has been denuded of absorbed hydrocarbons as completely as practical. Unabsorbed hydrocarbons and other low-boiling normally gaseous materials are withdrawn from oil absorption zone 5 via lines 7 and 9 to be used as desired, for instance in a cycling operation, for recycling to the wet gas field, from whence the feed gas mixture came, for maintaining pressure on said field. Oil absorption zone 5 is preferably operated at a maximum pressure of 5,000 pounds per square inch gauge, in the range from 100 to 5,000 pounds per square inch gauge. In the lower part of oil absorption zone 5 absorption conditions are maintained so that $C_4$ and lighter hydrocarbons are absorbed from the feed gas mixture by flashed absorption oil, this flashed absorption oil being substantially saturated with $C_5$ and heavier hydrocarbons, the higher boiling hydrocarbons in the feed gas mixture. In the upper portion of oil absorption zone 5 absorption conditions are maintained so as to absorb $C_5$ and heavier hydrocarbons which are not absorbed in the lower portion of oil absorption zone 5 with lean absorption oil. I find that at these relatively high oil absorption pressures I can operate oil absorption zone 5 so as to absorb substantially all of the $C_2$ and $C_3$ hydrocarbons, the methane absorbed causing no difficulty in subsequent operations as will be hereinafter set forth. Rich absorption oil containing hydrocarbons absorbed in oil absorption zone 5 is withdrawn from oil absorption zone 5 via line 11 and is passed into a flash zone 13 which may be comprised of one or more flash zones operating in series or in parallel. In flash zone 13 pressure on the rich absorption oil is reduced so as to flash off $C_4$ and lighter hydrocarbons which are withdrawn via line 15 to be treated as will hereinafter be set forth. Absorption oil denuded of $C_4$ and lighter hydrocarbons is withdrawn from flash zone 13 via line 17. A portion of this partially denuded absorption oil is passed back into oil absorption zone 5 via line 19 at a high enough rate to absorb the $C_4$ and light hydrocarbons desired to be recovered from the feed gas mixture. The remainder of the partially denuded absorption oil is passed via line 21 into distillation and recovery zone 23 wherein the partially denuded absorption oil is stripped of absorbed hydrocarbons, essentially $C_5$ and heavier hydrocarbons. Distillation and recovery zone 23 can be comprised of separation means including flashing, venting, fractional distillation and stripping. However, I find that a stripping operation using heat and/or steam is usually sufficient to strip the absorbed hydrocarbon from the absorption oil. If desired, dephlegmation can be used in conjunction with steam and/or heat stripping. Lean absorption oil is withdrawn from distillation and recovery zone 23 via line 25, and is passed back into the upper portion of oil absorption zone 5 wherein it is used to absorb the $C_5$ and heavier hydrocarbon constituents in the gaseous feed mixture. Distillation and recovery zone 23 as depicted in Figure 1 provides for cooling and partially condensing the vaporous hydrocarbons which are separated from the flashed absorption oil. If the absorption oil passed from flash zone 13 to distillation and recovery zone 23 has been substantially denuded of $C_4$ and lower boiling materials the hydrocarbons stripped from the absorption oil can be totally condensed and treated as hereinafter set forth. The liquid condensed, comprising the gasoline constituents recovered from the feed gas, is withdrawn from distillation and recovery zone 23 via line 27. It can be withdrawn from the system via line 29 to be used or treated as desired, or it can be passed via line 31 into fractionation zone 33 wherein light hydrocarbons, mostly $C_3$'s, are removed so as to produce a grade product gasoline. Fractionation zone 33 is usually referred to as a gasoline stabilizer. The vaporous hydrocarbons resulting from the cooling and partial condensation set forth above are withdrawn from distillation and recovery zone 23 via line 35 to be treated as hereinafter set forth. Stabilized or grade product gasoline is withdrawn from fractionation zone 33 via line 37 and the vaporous hydrocarbons resulting from stabilizing the raw gasoline are withdrawn from fractionation zone 33 via line 39 to be treated as hereinafter set forth. Vaporous hydrocarbon streams withdrawn from flash zone 13 via line 15, withdrawn from distillation and recovery zone 23 via line 35 and withdrawn from fractionation zone 33 via line 39 are treated in selective adsorption separation zone 41 to separate and recover the low-boiling normally gaseous hydrocarbon materials desired to be recovered. It is preferable that none of these vaporous hydrocarbon streams contain more than a small amount of $C_5$ and heavier hydrocarbons. It is desirable that they be substantially free from $C_5$ and heavier hydrocarbons because of the poisoning effect on the activity of selective adsorbents unless they are stripped from said selective adsorbents. I find that it is expensive to strip $C_5$ and heavier hydrocarbons from the selective adsorbents so as to reactivate the adsorbents, making my process less economical. I find that it is desirable to provide a guard 43 before selective absorption separation zone 41 to remove entrained absorption oil and/or $C_5$ and heavier hydrocarbons from the vaporous hydrocarbon streams passed into selective adsorption separation zone 41 via line 45. Of course, the vaporous hydrocarbon stream from flash zone 13 is more likely to contain entrained absorption oil and $C_5$ and heavier hydrocarbons than are the vaporous hydrocarbon streams from distillation and recovery zone 23 and fractionation zone 33. In connection with the guarding operation, I find that I can employ the method taught by C. R. Ringham and R. K. Simms in copending application Serial No. 106,228, filed July 22, 1949. Ringham and Simms teach a guarding method wherein a fixed bed of adsorbent, preferably activated charcoal, is used to selectively adsorb $C_5$ and heavier hydrocarbons, keeping them from entering selective adsorption separation zone 41. Their method of regenerating the fixed beds can advantageously be used in my process, that is, the hot regenerating gases, preferably bottoms make gas from separation zone 41, can be passed into the stripper usually employed in distillation and recovery zone 23. If the light hydrocarbons passed to selective adsorption separation zone 41 contain no more than a small amount of $C_5$ and heavier hydrocarbons, the guarding operation is usually unnecessary, and it is preferable that they be substantially free of such hydrocarbons. The vaporous hydrocarbon streams comprising $C_4$ and lighter hydrocarbon materials, those low-boiling normally gaseous hydrocarbon materials removed from the feed gas mixture, are treated in selective adsorption separation zone 41 to separate said streams into the hydrocarbon streams desired to be produced, such as a $C_3$ and heavier hydrocarbons stream or a $C_3$ stream and a $C_4$ stream, a $C_2$ hydrocarbon stream and a $C_1$ and lighter hydrocarbon stream, or if desired, they can be separated into a $C_3$ and heavier hydrocarbon stream and a $C_2$ and lighter hydrocarbon stream. Figure 1 depicts separation into a $C_3$ and heavier hydrocarbon stream which is withdrawn via line 47, a $C_2$ hydrocarbon stream which is withdrawn via line 49 and a $C_1$ and lighter hydrocarbon stream which is withdrawn via line 51. This $C_1$ and lighter residue gas stream can be withdrawn from the system via line 53 or it can be combined with the residue gas withdrawn via line 9. It is preferred that selective adsorption separation zone 41 be operated at a pressure of from 0 to 480 pounds per square inch absolute. So, the residue gas withdrawn via line 51, if it is desired to use it as a recycle gas to a wet gas field, must be repressured. As pointed out before, one of the chief advantages of the process of my invention, is that the oil absorption operation can be carried on at a much higher pressure than is necessary for separating and recovering low-boiling normally gaseous hydrocarbon materials in the selective adsorption separation operation, allowing the major portion of the residue gas to remain at substantially the same pressure as wet feed gas. Selective adsorption separation zone 41 can comprise any suitable selective adsorption separation system such as batch fixed bed, cyclic fixed bed or fluidized systems, utilizing activated-charcoal, silica gel, etc., for instance, the cyclic fixed bed system taught by R. D. Bauer in copending application, Serial No. 101,611, filed July 27, 1949. Bauer teaches a cyclic operation system wherein relatively pure hydrocarbon product streams are produced by employing a unique "refluxing" step as one of the cycles of operation. However, I prefer to use one or more continuous activated-charcoal adsorbers, utilizing a continuous moving bed of activated-charcoal, such preferred separation means employing a selective adsorption zone, stripping with indirect heat furnished by Dowtherm and/or direct heat furnished by steam and/or heated product gas in a stripping zone and subsequent cooling of the stripped charcoal in a cooling zone prior to its reintroduction into the adsorption zone.

My process can be operated by passing the rich absorption oil withdrawn from oil adsorption zone 5 into distillation recovery zone 23 via line 54 or a portion of the rich absorption oil can be passed directly into distillation and recovery zone 23, the remaining rich absorption oil being flashed in flash zone 13. This is a particularly advantageous means of varying the load on flash zone 13 and the equipment employed in distillation and recovery zone 23 so as to give more leeway in the quantity and quality of feed gas treated by the process of my invention. However, I find that flashing the rich absorption oil followed by stripping is an efficient and the most desirable means of removing the absorbed hydrocarbons from the absorption oil, requiring the least amount of equipment.

Referring now to Figure 2 which diagrammatically sets forth another preferred specific embodiment of the process of my invention which can be used for treating the same feed gases as set forth in the discussion of flow sheet 1. The equipment, lines, etc. which perform essentially the same functions as are performed in the diagrammatic flow sheet, Figure 1, are labeled with the same reference characters. The essential difference between the process as set forth in Figure 2 and the process as set forth in Figure 1 is that in the process of Figure 2 two oil absorption zones are used to absorb the desired hydrocarbon materials from the feed gas, the first of said two oil absorption zones being employed to remove $C_5$ and heavier hydrocarbons with lean absorption oil and the second to remove $C_4$ and lighter hydrocarbons, the low-boiling normally gaseous hydrocarbon materials desired to be recovered, with an absorption oil which has been denuded of those low-boiling normally gaseous hydrocarbons desired to be recovered. The system as set forth by Figure 2 as the system set forth by Figure 1 is particularly adaptable to treating feed gases available at pressures of from 400 to 5,000 pounds per square inch gauge. The same advantages are realized, particularly that advantage of retaining most of the residue gas at its relatively high feed gas pressure. Both oil absorption zones are preferably operated at pressures of from 100 to 5,000 pounds per square inch gauge, allowing a high recovery of low-boiling normally gaseous hydrocarbon materials if desired, just as in the treating system as set forth in Figure 1. The gaseous hydrocarbon feed gas mixture is passed into oil absorption zone 55 via line 3 and therein it is countercurrently and directly contacted with lean absorption oil under absorption conditions so as to absorb $C_5$ and heavier hydrocarbons. The rich absorption oil is withdrawn from oil absorption zone 55 via line 57 and is passed into distillation and recovery zone 23 wherein the absorbed $C_5$ and heavier hydrocarbons are removed from the absorption oil. Lean absorption oil stripped of absorbed hydrocarbons as completely as practical is then recycled to oil absorption zone 55 via line 25. The unabsorbed $C_4$ and lighter hydrocarbons and other low-boiling normally gaseous materials are withdrawn from oil absorption zone 55 via line 59 and are passed into the lower portion of oil absorption zone 61 wherein they are countercurrently and directly contacted with flashed absorption oil denuded of $C_4$ and lighter hydrocarbons, the low-boiling normally gaseous hydrocarbon materials desired to be recovered. Rich absorption oil is withdrawn from oil absorption zone 61 via line 63 and is passed into flash zone 13 wherein the rich absorption oil is flashed to remove the $C_4$ and lighter hydrocarbons. I find that due to carryover from oil absorption zone 55, the absorption oil employed in oil absorption zone 61 will slowly become saturated with $C_5$ and heavier hydrocarbons, and if desired, a mineral seal oil saturated with $C_5$ and heavier hydrocarbons can be used as the absorption oil employed in oil absorption zone 61. The vaporous hydrocarbon streams removed from distillation recovery zone 23 via line 35, from flash zone 13 via line 15 and from fractionation zone 33 via line 39 are treated in selective adsorption separation zone 41 to separate and recover the low-boiling normally gaseous hydrocarbon materials desired to be recovered. Of course, raw unstabilized gasoline can be withdrawn from the system via lines 27 and 29 if desired. As in the system shown diagrammatically in Figure 1 unabsorbed residue gas is withdrawn via line 9 for recycling or for use otherwise, and, as before, residue gas from selective adsorption separation zone 41 can be withdrawn from the system via line 53 or it can be repressured and combined with the residue gas from oil absorption zone 61. Lean absorption oil from distillation and recovery zone 23 can be passed into oil absorption zone 61 via line 65 for absorption of $C_4$ and lighter hydrocarbons. Likewise, line 67 is provided for withdrawing absorption oil denuded of $C_4$ and lighter hydrocarbons from flash zone 13 so that it may be passed into distillation and recovery zone 23. Provision for such interchange of the absorption oils is particularly advantageous since it provides a method for changing operations to handle different quantities of feed gas, and also, such means of interchanging the absorption oils provides a method for varying operations to handle feed gases of different composition.

The above set forth discussions of the process of my invention as depicted by diagrammatic flow sheets 1 and 2 are typical examples of the application of the process of my invention.

As will be evident to those skilled in the art, various modifications of this invention can be made, or followed, in the light of this disclosure and discussion, without departing from the spirit or scope of the disclosure or from the scope of the claims.

I claim:

1. A process for treating a gaseous mixture comprising saturated $C_1$ to more than $C_5$ hydrocarbons and other low-boiling normally gaseous materials, which comprises passing said gaseous mixture into an oil absorption zone, operating at a pressure of from 400 to 5,000 pounds per square inch gauge, and therein in the only absorption operations employed directly and countercurrently contacting said gaseous mixture, first with absorption oil denuded of butanes and lighter hydrocarbon materials under absorption conditions so as to absorb propane and butanes from said gaseous mixture, and second with lean absorption oil under absorption conditions so as to absob $C_5$ and heavier hydrocarbons from said gaseous mixture, withdrawing unabsorbed hydrocarbons and other low-boiling normally gaseous materials from said oil absorption zone as a product of the process, withdrawing a resulting rich absorption oil from said absorption zone and passing same directly into a flash zone and therein flashing same, withdrawing a vaporous stream of hydrocarbon materials substantially free from $C_5$ and heavier hydrocarbons from said flash zone, withdrawing flashed absorption oil from said flash zone and passing a first portion of same into said oil absorption zone as said absorption oil denuded of butanes and lighter hydrocarbon materials directly contacted with said gaseous mixture, passing a second portion of said flashed oil withdrawn from said flash zone into a distillation and recovery zone and therein separating and recovering, a vaporous hydrocarbon stream substantially free from $C_5$ and heavier hydrocarbons, a liquid hydrocarbon stream of unstabilized gasoline and lean absorption oil, passing said lean absorption oil into said oil absorption zone as said lean absorption oil directly contacted with said gaseous mixture, passing said liquid hydrocarbon stream of unstabilized gasoline into a fractionation zone and therein stabilizing same, withdrawing stabilized gasoline from said fractionation zone as a product of the process, withdrawing a vaporous stream of hydrocarbons substantially free from $C_5$ and heavier hydrocarbons from said fractionation zone, passing said vaporous hydrocarbon streams, withdrawn from said flash zone, withdrawn from said fractionation zone and recovered in said distillation and recovery zone directly into a charcoal adsorption zone, withdrawing a hydrocarbon vapor stream from said charcoal adsorption zone and passing same directly to a continuous moving bed activated-charcoal selective adsorption separation zone operating at a pressure of from 0 to 480 pounds per square inch absolute, and therein separating said vaporous hydrocarbon streams into a $C_3$ and heavier hydrocarbon stream and a $C_2$ and lighter hydrocarbon stream, each as an additional product of the process.

2. The process of claim 1 wherein said hydrocarbon vapor streams passed to said continuous moving bed activated-charcoal selective adsorption separation zone are separated into a $C_3$ and heavier hydrocarbon stream, a $C_2$ hydrocarbon stream and a $C_1$ and lighter hydrocarbon stream, each as an additional product of the process.

ALVIN J. MILLER.

REFERENCES CITED

The following references are of record in the file of this patent:

UNITED STATES PATENTS

| Number | Name | Date |
|---|---|---|
| 1,422,007 | Soddy | July 4, 1922 |
| 2,183,604 | Barton et al. | Dec. 19, 1939 |
| 2,190,662 | Houdry | Feb. 20, 1940 |
| 2,290,957 | Hachmuth | July 28, 1942 |
| 2,299,830 | Legatski et al. | Oct. 27, 1942 |
| 2,388,732 | Finsterbusch | Nov. 13, 1945 |

OTHER REFERENCES

Berg: Trans. Am. Inst. of Chem. Engineers, vol. 42, pp. 665–80 (1946).

Thornton: Petroleum Processing, vol. 3, pp. 1052–54, (Nov. 1948).